United States Patent
Lindquist et al.

(10) Patent No.: US 6,527,468 B1
(45) Date of Patent: Mar. 4, 2003

(54) BALL JOINT WITH DUAL TAPERED STUD CONNECTION

(75) Inventors: David Lindquist, Rochester Hills, MI (US); Robert J. Schmidt, St. Catharines (CA); Brian A. Urbach, Rochester Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/973,202

(22) Filed: Oct. 9, 2001

(51) Int. Cl.[7] .................................................. F16C 11/00
(52) U.S. Cl. ..................... 403/122; 403/409.1; 403/135
(58) Field of Search .................................. 403/122, 132, 403/134, 135, 136, 138, 142, 409.1

(56) References Cited

U.S. PATENT DOCUMENTS

| | | | |
|---|---|---|---|
| 5,284,398 A | | 2/1994 | Sakai |
| 5,312,200 A | * | 5/1994 | Buhl et al. .................. 403/134 |
| 5,615,967 A | * | 4/1997 | Hellon ........................ 403/133 |
| 5,697,723 A | * | 12/1997 | Wood ......................... 403/135 |
| 5,927,891 A | * | 7/1999 | Trumbower et al. .... 403/122 X |
| 6,010,274 A | | 1/2000 | Abouzahr |

* cited by examiner

*Primary Examiner*—Lynne H. Browne
*Assistant Examiner*—John R. Cottingham
(74) *Attorney, Agent, or Firm*—Tarolli, Sundheim, Covell & Tummino L.L.P.

(57) ABSTRACT

A ball joint (10) for supporting a first suspension member (12) for movement relative to a second suspension member (14) comprises a socket (30) for connection with the first suspension member, a bearing (38) in the socket, and a stud (40) having a first end portion (42) and a second end portion (50). The bearing (38) supports the first end portion (40) of the stud (40) in the socket (30) for pivotal movement relative to the socket. The second end portion (50) of the stud (40) projects from the socket (30) for connection with the second suspension member (14). The second end portion (50) of the stud (40) has a tapered outer surface (60). The second suspension member (14) has a tapered inner surface (22) defining an opening (24) in the second suspension member. The ball joint (10) further comprises a collar (70) on the stud (40). The collar (70) has a tapered inner surface (76) in engagement with the tapered outer surface (60) of the stud, and a tapered outer surface (78) in engagement with the tapered inner surface (22) of the second suspension member (14).

9 Claims, 1 Drawing Sheet

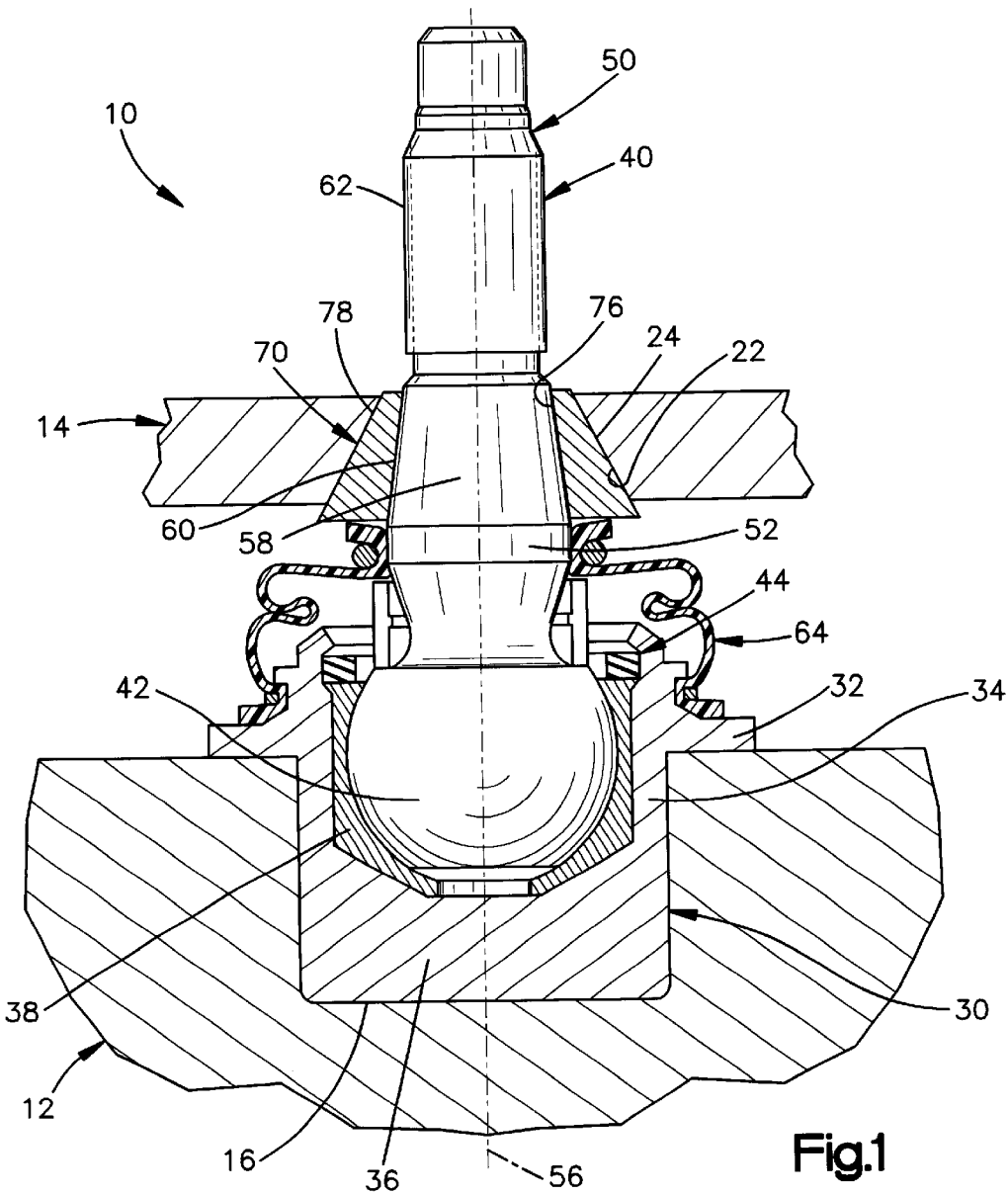
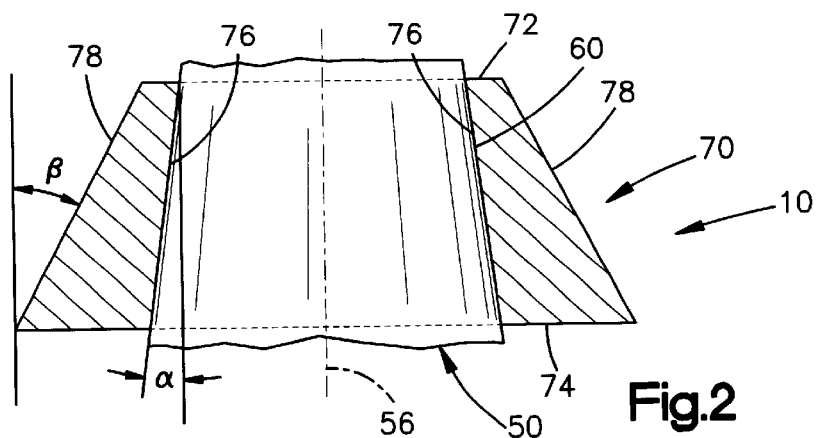

BALL JOINT WITH DUAL TAPERED STUD CONNECTION

BACKGROUND OF THE INVENTION

1. Field of the Invention

The present invention relates to a ball joint for supporting a first suspension member for movement relative to a second suspension member. In particular, the present invention relates to a ball joint which has a tapered steel stud to be attached to an aluminum suspension member.

2. Description of the Related Art

A typical motor vehicle suspension includes a plurality of members, such as control arms, steering knuckles, etc., which are interconnected for relative movement by ball joints. The ball joint typically includes a tapered steel stud to be received in a tapered bore in the suspension member. Some suspension members are made from a relatively soft material, such as aluminum. If the unit surface area loading on an aluminum suspension member is too great, the aluminum can yield under load, which is undesirable.

SUMMARY OF THE INVENTION

The present invention is a ball joint for supporting a first suspension member for movement relative to a second suspension member. The ball joint comprises a socket for connection with the first suspension member, a bearing in the socket, and a stud having a first end portion and a second end portion. The bearing supports the first end portion of the stud in the socket for pivotal movement relative to the socket. The second end portion of the stud projects from the socket for connection with the second suspension member. The second end portion of the stud has a tapered outer surface.

The second suspension member has a tapered inner surface defining an opening in the second suspension member. The ball joint further comprises a collar on the stud. The collar has a tapered inner surface in engagement with the tapered outer surface of the stud, and a tapered outer surface in engagement with the tapered inner surface of the second suspension member.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a sectional view of a portion of a vehicle suspension including a ball joint constructed in accordance with the present invention; and FIG. 2 is an enlarged view of a collar that forms a part of the ball joint of FIG. 1.

DETAILED DESCRIPTION OF THE INVENTION

The present invention relates to a ball joint for supporting a first suspension member for movement relative to a second suspension member. The present invention is applicable to various ball joint constructions. As representative of the invention, FIG. 1 illustrates a ball joint 10. The ball joint 10 is located between a first suspension member shown partially at 12 and a second suspension member shown partially at 14.

The first suspension member 12 may be a steering knuckle or steering yoke, for example. The first suspension member 12 has a cylindrical opening 16 for receiving the ball joint 10.

The second suspension member 14 may be a control arm or steering yoke or steering knuckle, for example. The second suspension member 14 is made from a relatively soft material, that is, a material that is softer than steel. The second suspension member 14 may be made from aluminum, for example. The second suspension member 14 has a frustoconical surface 22 that defines a tapered bore or opening 24.

The ball joint 10 is generally of a conventional construction and includes a socket 30 and a steel ball stud 40. A mounting flange 32 extends radially outward from a side wall 34 of the socket 30, adjacent to a closed lower end 36 of the socket. The socket 30 is mounted in the opening 16 in the first suspension member 12.

A bearing 38 is located in the socket 30. A ball end portion 42 of the ball stud 40 is received in the bearing 38. The ball end portion 42 is rotatable and pivotable in the bearing 38 to provide for relative movement between the first suspension member 12 and the ball stud 40. A retainer 44 holds the bearing in place in the socket.

The ball stud 40 has a shank portion 50. The shank portion 50 has a cylindrical first section 52 centered on a longitudinal central axis 56 of the ball stud 40. The shank portion 50 also has a second section 58 that has a tapered outer surface 60 centered on the axis 56 and extending at a first angle α (FIG. 2) to the axis. The shank portion 50 also has a threaded end section 62.

The ball joint 10 further includes a seal 64. The seal 64 extends between the socket 30 and the first section 52 of the ball stud 40.

The ball joint 10 includes a collar 70 (FIGS. 1 and 2). The collar 70 is a metal member that is formed separately from the ball stud 40. The collar 70 has annular first and second end surfaces 72 and 74 (FIG. 2) that extend parallel to each other and perpendicular to the axis 56.

The collar 70 has a tapered or frustoconical inner surface 76 centered on the axis 56. The collar 70 has tapered or frustoconical outer surface 78 centered on the axis 56. The collar 70 thus has a trapezoidal exterior configuration when seen in elevation as in FIGS. 1 and 2.

The inner surface 76 extends between the first and second end surfaces 72 and 74, at the first angle α to the axis 56. The outer surface 78 of the collar 70 extends between the first and second end surfaces 72 and 74, at a second angle β to the axis 56. The second angle β is greater than the first angle α. As a result, the surface area of the frustoconical outer surface 78 of the collar 70 is greater than the surface area of the frustoconical inner surface 76 of the collar.

The collar 70 is placed on the ball stud 40 prior to assembly of the ball joint 10 into the first and second suspension members 12 and 14. The tapered inner surface 76 of the collar 70 engages the tapered outer surface 60 on the ball stud 40 in a tight, force-fitting connection. The socket 30 of the ball joint 10 is then fitted in the opening 16 in the first suspension member 12.

When the ball joint 10 is, thereafter, assembled with the second suspension member 14, the collar 70 of the ball joint is received in the tapered bore 24 in the second suspension member. The frustoconical outer surface 78 of the collar 70 engages the frustoconical surface 22 in the second suspension member 14 in a tight, force-fitting connection.

When the parts are thus assembled, the unit surface area loading on the taper connection between the collar 70 and the second suspension member 14 is less than the unit surface area loading on the taper connection between the collar and the ball stud 40. This is because the surface area of the outer surface 78 of the collar 70 is greater than the surface 76 area of the inner surface of the collar. This result is beneficial as it relates to the second suspension member 14, which is made from a softer material (aluminum) than the ball stud 40 (steel). The presence of the collar 40 reduces the unit surface area loading on the second suspension member 14 to below the yield point of the aluminum of which it is made, in comparison to an assembly in which the ball stud 40 would be fitted directly into the opening 24 in the second suspension member. This enables the two parts 40 and 14 to generate a taper lock that will not loosen during use and operation of the ball joint 10.

From the above description of the invention, those skilled in the art will perceive improvements, changes and modifications in the invention. For example, the invention is usable in a ball joint that forms part of a tie rod end. Also, the suspension members between which the ball joint is connected can be any two relatively movable parts of a vehicle between which a tapered connection is used. Such improvements, changes and modifications within the skill of the art are intended to be covered by the appended claims.

Having described the invention, I claim:

1. A ball joint for supporting a first suspension member for movement relative to a second suspension member, said ball joint comprising:

a socket for connection with said first suspension member;

a bearing in said socket;

a stud having a first end portion and a second end portion;

said bearing supporting said first end portion of said stud in said socket for pivotal movement relative to said socket;

said second end portion of said stud projecting from said socket for connection with the second suspension member, said second end portion of said stud having a tapered outer surface;

said second suspension member having a tapered inner surface defining an opening in said second suspension member;

said ball joint further comprising a collar on said stud, said collar having a tapered inner surface in engagement with said tapered outer surface of said stud, and said collar having a tapered outer surface in engagement with said tapered inner surface of said second suspension member.

2. A ball joint as set forth in claim 1 wherein said stud has a longitudinal central axis on which said tapered outer surface of said stud is centered;

said tapered outer surface of said stud extending at a first angle to said axis;

said tapered inner surface of said collar extending at said first angle to said axis; and said tapered outer surface of said collar extending at a second angle greater than said first angle to said axis.

3. A ball joint as set forth in claim 2 wherein said second suspension member is made from a softer material than said stud.

4. A ball joint as set forth in claim 3 wherein said second suspension member is made from aluminum and said stud is made from steel.

5. A ball joint as set forth in claim 3 wherein said collar is made from the same material as said stud.

6. A ball joint as set forth in claim 1 wherein said second suspension member is made from a softer material than said stud.

7. A ball joint as set forth in claim 6 wherein said second suspension member is made from aluminum and said stud is made from steel.

8. A ball joint as set forth in claim 6 wherein said collar is made from the same material as said stud.

9. A ball joint as set forth in claim 6 wherein said stud has a longitudinal central axis on which said tapered outer surface of said stud is centered;

said tapered outer surface of said stud extending at a first angle to said axis;

said tapered inner surface of said collar extending at said first angle to said axis; and said tapered outer surface of said collar extending at a second angle greater than said first angle to said axis.

* * * * *